United States Patent Office 3,414,603
Patented Dec. 3, 1968

3,414,603
METHOD OF PURIFYING ORGANO-CHLOROSILANES
Abraham I. Mlavsky, Lexington, Mass., assignor to Tyco Laboratories, Inc., Waltham, Mass., a corporation of Massachusetts
No Drawing. Filed Mar. 16, 1965, Ser. No. 440,316
8 Claims. (Cl. 260—448.2)

ABSTRACT OF THE DISCLOSURE

The method of removing metallic elements from organochlorosilanes by passing the contaminated organochlorosilanes through absorption columns containing an anion exchange resin having attached to its polymer chain selected nucleophilic quaternary ammonium groups or nucleophilic tertiary amine groups.

---

This invention relates to purification of organochlorosilanes and more particularly to a method of treating organochlorosilanes to remove traces of metallic impurities.

Organochlorosilanes have application in the synthesis of other materials. Of particular interest in the synthesis of silicon carbide for semiconductor applications by hydrogen reduction of methyltrichlorosilane at an elevated temperature. In practice it has been difficult to achieve the requisite product purity; invariably the silicon carbide contans one or more undesired metallic elements in quantities sufficient to impede manufacture of acceptable semiconductor devices. I have concluded that the impurity content involves one or more elements—boron, aluminum, titanium, copper, iron, and vanadium—originally present in the methyltrichlorosilane as a halide, e.g., $BCl_3$, $AlCl_3$, etc. These same impurities occur in other organochlorosilanes.

Accordingly one object of this invention is to provide methyltrichlorosilane that can be converted to silicon carbide that is substantially free of metallic impurities.

A second and more general object of this invention is to provide a method of purifying organochlorosilanes to eliminate certain metallic impurities.

I have determined that traces of boron, aluminum, titanium, copper, iron, vanadium, and other heavy metals that form halides, can be removed from organochlorosilanes by passing the contaminated organochlorosilanes through absorption columns containing an anion exchange resin having attached to its polymer chain selected nucleophilic groups.

As used herein the term "ion exchange resin" is defined as a three dimensional hydrocarbon polymer to which a large number of polar exchange groups is attached. For the purposes of this invention it is necessary to employ anion exchange resins that are insoluble in the organochlorosilanes to be treated and whose polar groups are nucleophilic quaternary ammonium groups corresponding to the formula —$NR_3Cl$ or nucleophilic tertiary amine groups represented by the formula —$NR_2$, with R representing an alkyl or aryl radical that may be different from other radicals in the same or another exchange group. By way of illustration but not limitation, R may be a methyl, ethyl, or phenyl group. Thus, for example, the quaternary ammonium group may be a triethylammonium chloride radical while the tertiary amine group may be a dimethylamine radical.

Preferably but not necessarily the three dimensional polymer chain structure of the anion exchange resin is of the well known polystyrene type that is formed by polymerization of styrene and divinyl benzene. A wide variety of anion exchange resins having the requisite polymer structure and exchange groups are commercially available under a variety of trade names, including but not limited to "Amberlite" and "Dowex."

For example, "Amberlite IRA-400 (Cl)" is effective in carrying out the process of the present invention. The resin is a strong basic anion exchange resin containing quaternary ammonium groups and is supplied as a chloride salt. Other "Amberlite" anion exchange resins also are effective with respect to the practice of the present invention. Other similar basic —$NH_2$ and —$NH_3Cl$ resins are listed on pp. 24 and 25 of the text, "Ion Exchange Technology," by F. C. Nachod, et al., published by Academic Press Inc., New York, N.Y. (1956).

The resins applicable to the present invention may be used singly or together in the same or different columns. One or a battery of columns may be used to attain the desired degree of purification.

The invention is applicable generally to purification of organochlorosilanes corresponding to the formula $$R_n'\text{---Si---}Cl_{4-n}$$

where $n$ is an integer whose value is $4>n>0$ and R' represents a group including but not limited to methyl, ethyl, and phenyl groups. Where $R_n'$ includes more than one substituent radical, they may be different. By way of example but not limitation, the invention is applicable to purification of such compounds as methyltrichlorosilane, ethyltrichlorosilane, phenyltrichlorosilane, dimethyldichlorosilane, diethyldichlorosilane, diphenyldichlorosilane, methylphenyldichlorosilane, trimethylchlorosilane, and triethylchlorosilane.

The following examples illustrate how the invention is practiced.

EXAMPLE I

Into a glass column of suitable size, e.g., about two yards long and one inch internal diameter, is disposed an anion exchange resin constituting a polyvinyl structure with a nucleophilic diemethylamine group —$N(CH_3)_2$. Through this column is passed a slightly yellow colored methyltrichlorosilane known to be contaminated with traces of boron and aluminum. The methyltrichlorosilane is in liquid form and is passed through the column at a rate of approximately 1 liter per minute. A clear liquid consisting of essentially pure methyltrichlorosilane is obtained from the discharge end of the column.

EXAMPLE II

Two columns of glass each measuring approximately one yard in length and one inch in internal diameter are connected in series. Into each glass column is placed a strongly basic anion exchange resin comprising a copolymer of styrene and divinyl benzene having quaternary ammonium groups such as triethylammonium chloride. Methyltrichlorosilane in the vapor phase contaminated with traces of boron and aluminum in chloride form is passed through the battery of glass columns. After passing through the columns the gaseous silane is condensed. The recovered methyltrichlorosilane is a clear liquid which upon analysis is found to be essentially free of boron and aluminum.

It is apparent that various changes may be made in the process described herein without departing from the principles of the invention or changing the results. Therefore the invention is not to be limited by the foregoing specific examples but its scope is to be determined only by the appended claims.

I claim:

1. A process for purifying organochlorosilanes comprising the step of passing an organochlorosilane contaminated with halides of elements from the group consisting of boron, aluminum, titanium, copper, iron, and vanadium through absorption columns containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

2. A process as defined by claim 1 wherein said organochlorosilane is methyltrichlorosilane.

3. A process of purifying organochlorosilanes of inorganic boron halides comprising the step of passing an organochlorosilane contaminated with a boron halide through an absorption column containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

4. A process of purifying organochlorosilanes of inorganic aluminum halides comprising the step of passing an organochlorosilane contaminated with an aluminum halide through an absorption column containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

5. A process of purifying organochlorosilanes of inorganic titanium halides comprising the step of passing an organochlorosilane contaminated with a titanium halide through an absorption column containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

6. A process of purifying organochlorosilanes of inorganic copper halides comprising the step of passing an organochlorosilane contaminated with a copper halide through an absorption column containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

7. A process of purifying organochlorsilanes of inorganic iron halides comprising the step of passing an organochlorosilane contaminated with an iron halide through an absorption column containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

8. A process of purifying organochlorosilanes of inorganic vanadium halides comprising the step of passing an organochlorosilane contaminated with a vanadium halide through an absorption column containing an anion exchange resin having attached to its polymer chain nucleophilic exchange groups selected from the class consisting of tertiary amine radicals corresponding to the formula (—NR$_2$) and quaternary ammonium radicals corresponding to the formula (—NR$_3$Cl), wherein R is a member of the class consisting of alkyl and aryl radicals.

References Cited
UNITED STATES PATENTS

| | | | |
|---|---|---|---|
| 2,752,379 | 6/1956 | Wagner et al. | 260—448.2 |
| 2,917,529 | 12/1959 | Drysdale | 260—448.2 |
| 3,359,186 | 12/1967 | Petelinkar | 260—448.2 |

TOBIAS E. LEVOW, *Primary Examiner.*

P. F. SHAVER, *Assistant Examiner.*